United States Patent
Cotte et al.

[11] Patent Number: 5,989,751
[45] Date of Patent: Nov. 23, 1999

[54] HIGH ENERGY DENSITY, FLEXIBLE LITHIUM PRIMARY BATTERIES

[75] Inventors: John M. Cotte, New Fairfield, Conn.; Madhav Datta, Yorktown Heights, N.Y.

[73] Assignee: International Business Machines Corporation, Armonk, N.Y.

[21] Appl. No.: 08/876,786

[22] Filed: Jun. 16, 1997

[51] Int. Cl.⁶ .............................. H01M 6/14; H01M 4/50; H01M 4/64
[52] U.S. Cl. .......................... 429/331; 429/127; 429/176; 429/217; 429/224; 429/233
[58] Field of Search .................... 429/127, 194, 429/197, 191, 192, 218, 224, 232, 331, 217, 176, 233

[56] References Cited

U.S. PATENT DOCUMENTS

| | | | |
|---|---|---|---|
| 5,474,862 | 12/1995 | Okuno et al. | 429/197 |
| 5,552,239 | 9/1996 | Gozdz et al. | 429/94 |
| 5,558,957 | 9/1996 | Datta et al. | 429/127 |
| 5,571,637 | 11/1996 | Idota | 429/197 X |

*Primary Examiner*—John S. Maples
*Attorney, Agent, or Firm*—Domenica N.S. Hartman; Gary M. Hartman; Casey P. August

[57] ABSTRACT

A primary lithium battery particularly adapted for use in self-contained self-powered devices (SSPD) for mobile communication and computing products, such as radio frequency identification tags, PCMCIA cards, and smart cards. The battery has a flexible and compact design which eliminates use of a separate electrolyte membrane by utilizing an electrolyte-bearing composite cathode that preferably has a polyacrylonitrile matrix. Performance of the battery is optimized by controlling the amount of aprotic organic solvents within the composite cathode within a prescribed range of ratios. In so doing, the performance characteristics of the battery closely approximate those having conventional liquid electrolytes without the safety concerns associated with liquid electrolyte leakage, and exhibit enhanced performance at sub-ambient temperatures. A further feature is that the composite cathode is encapsulated within a polymeric matrix that eliminates the exposure hazard posed by the lithium intercalation compounds used within the cathode. The battery is enclosed in a customized laminate stack for sealing and encapsulation. Alternative packaging embodiments are also disclosed.

20 Claims, 3 Drawing Sheets

HIGH ENERGY DENSITY, FLEXIBLE LITHIUM PRIMARY BATTERIES

BACKGROUND OF THE INVENTION

1. Field of the Invention

Generally, this invention relates to primary lithium batteries for use in self-contained self-powered devices (SSPD) such as radio frequency identification tags, PCMCIA cards, and smart cards. More particularly, this invention relates to improved component design and packaging for flexible lithium batteries adapted for use in self-contained self-powered devices.

2. Cross-Reference

The invention disclosed and claimed herein is related to the inventions disclosed and claimed in applications Ser. Nos. 08/614,982 and 08/727,096, now abandoned which were filed on Mar. 12, 1996 and Oct. 8, 1996, respectively, and which are assigned to the same assignee as the instant invention.

3. Description of Prior Art

Self-contained self-powered portable devices (SSPD) encompass an increasingly large market of mobile communication and computing products such as radio frequency identification (RF-ID) tags, PCMCIA cards, and smart cards. For a battery to be useable in such applications, it must meet several demanding characteristics. First, for safety reasons, the battery must be constructed of all solid components while still being flexible and compact. Secondly, the battery should exhibit similar conductivity characteristics to primary batteries with liquid electrolytes, i.e., deliver high energy density and specific energy with low rates of self-discharge. Thirdly, the battery should be readily manufacturable in a manner that yields a battery that is both reliable and cost-efficient. Finally, the battery must also be able to maintain a necessary minimum level of conductivity at sub-ambient temperatures.

Primary (non-rechargeable) lithium batteries have been found particularly well suited for meeting these requirements. Such batteries can be constructed of all solid components, including the electrolyte in order to avoid the hazard of electrolyte leakage. Such electrolytes have been formed as a solid polymer electrolyte composed of a polymer membrane having a suitable electrolyte contained within its matrix.

The use of polyethylene oxide (PEO) as a solid polymer electrolyte membrane material for a flexible lithium battery has been proposed in the prior art. Solid electrolytes formed with this material have exhibited satisfactory ambient temperature conductivity, and provide good performance at sub-ambient temperatures when used to deliver short current pulses of about thirty $\mu A/cm^2$ per for durations of up to about 10 milliseconds. Also, polyethylene oxide-based lithium batteries can be readily manufactured using well-established fabrication techniques, yielding a flexible battery that is both reliable and cost-efficient.

While batteries with polyethylene oxide-based electrolyte membranes have achieved many design criteria for SSPD applications, further improvements, such as minimizing the thickness of the electrolyte membrane, or eliminating it altogether, and minimizing or eliminating inactive materials would be desirable and would result in batteries having higher energy densities.

SUMMARY OF THE INVENTION

This invention is generally a lithium battery optimized for use in consumer microelectronics products, and particularly self-contained self-powered devices (SSPD) such as radio frequency identification tags, PCMCIA cards, and smart cards. The battery is generally composed of all solid components, including a lithium foil anode and an electrolyte-containing cathode sandwiched between a pair of flexible current collectors, yielding a battery that is sufficiently flexible and compact to permit its use in various SSPD applications. In addition, the battery of this invention is characterized by enhanced power generating capabilities at sub-ambient temperatures as compared to prior art solid electrolyte batteries, and is therefore well suited for more demanding SSPD applications.

To achieve the above, the cathode of the battery of this invention serves both as the cathode and the electrolyte membrane, two separate components of prior art batteries. This novel cathode is composed of carbon, $MnO_2$ and an electrolyte within a polymeric binder. The electrolyte includes a lithium salt and an organic aprotic solvent composed of ethylene carbonate, propylene carbonate and gamma-butyrolactone in a predetermined ratio. Flexible primary batteries constructed in accordance with the above are capable of exhibiting a cell voltage of at least about 2.5 volts when discharged with a current pulse of about 100 microamperes, a pulse on-time of about 150 milliseconds and a pulse period of about one second while at a temperature of about 0° C. to about −20° C.

A preferred aspect is that a flexible primary battery constructed in accordance with this invention utilizes a flexible foil composite cathode within an encapsulating matrix, such that complexities associated with handling the composite cathode and exposure to its active ingredients are overcome. Alternative packaging designs are also disclosed.

BRIEF DESCRIPTION OF THE DRAWINGS

The above and other advantages of this invention will become more apparent from the following description taken in conjunction with the accompanying drawings, in which.

DETAILED DESCRIPTION OF THE PREFERRED EMBODIMENT

In accordance with the present invention, it has been discovered that the electrolyte membrane in previous batteries can be eliminated. The electrolyte membrane and cathode of previous batteries are replaced by the composite cathode of the present battery which is fabricated by mixing the solid components (MnO$_2$ and carbon) in a polymer electrolyte solution. It has also been found that the thin layer of electrolyte which forms on the surface of the composite cathode is sufficient to provide ionic transport and to eliminate short circuiting of the anode and the cathode. Elimination of the electrolyte membrane is advantageous since the electrolyte membrane adds weight, increases the volume of the cell and also increases internal cell resistance.

Hence, the present invention provides a primary lithium battery, especially suitable for use in SSPD applications, in which the battery is constructed of all solid components, including a solid, flexible electrolyte containing cathode which is characterized by power generating and conductivity properties comparable to conventional primary batteries having liquid electrolytes.

Figure 1:
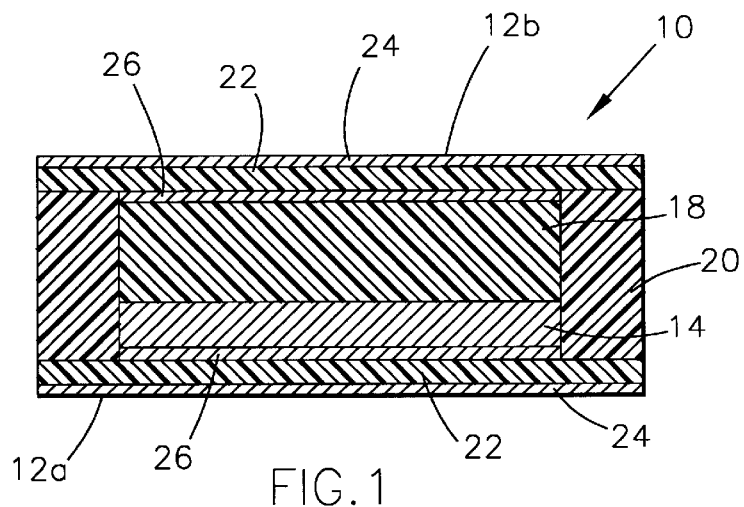
FIG. 1 shows in cross-section the construction of a flexible primary battery in accordance with this invention.
Figure 2:
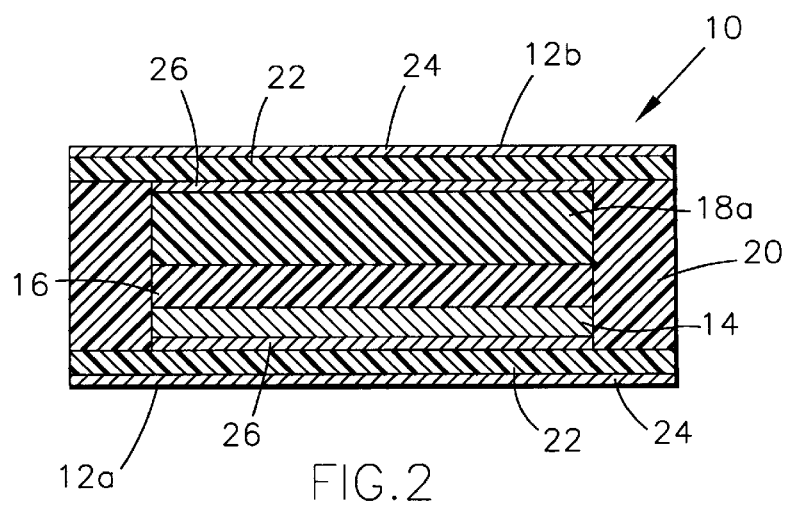
FIG. 2 shows in cross-section the construction of a flexible primary battery having a solid polymeric electrolyte membrane situated between the cathode and anode.

A suitable battery construction is represented in cross-section in FIG. 1. Battery 10 generally includes a pair of current collectors 12a and 12b, lithium foil anode 14 and solid but flexible electrolyte-containing cathode 18 which is herein referred to as the composite cathode. In some previous batteries, the electrolyte was in the form of a solid polymeric electrolyte membrane 16 situated between cathode 18a and anode 14 as shown in FIG. 2. In the packaging embodiment shown in FIG. 1, a polymer spacer 20 circumscribes the anode 14 and composite cathode 18 as shown. Battery 10 has a planar shape, and can be configured to have essentially any suitable size and peripheral shape. As those skilled in the art will recognize, a suitable shape and size for the battery 10 will depend on the particular application for the SSPD and the cell capacity required.

As shown in FIG. 1, flexible current collectors 12a and 12b have a laminar construction with a thickness of about forty micrometers to about one hundred micrometers. Current collectors 12a and 12b perform the important function of providing flexible packaging for the battery 10. Current collectors 12a and 12b also encapsulate lithium foil anode 14 and composite cathode 18 to protect these components from air and moisture. Current collectors 12a and 12b are preferably composed of a polymeric sheet 22 with a metal barrier film 24 deposited on one of its surfaces and a metal foil 26 formed on its opposite surface. Polymeric sheet 22 is preferably polyester, though other suitable materials could be used, and has a thickness of about twenty-five to about thirty micrometers, with a preferred thickness being about twenty-five micrometers (to scale with the dimensions of the other components in this particular embodiment). Metal foil 26 is preferably a copper foil having thickness of about fifteen to about fifty micrometers, and preferably about fifteen micrometers.

As also shown in FIG. 1, metal foils 26 do not cover the entire surface of their respective polymeric sheets 22, such that the entire perimeter of the polymeric sheet 22 remains exposed. Barrier film 24 serves as a barrier to moisture and air for battery 10, and it is preferably copper or aluminum having a thickness of about 200 to about 5000 angstroms, with a preferred thickness of about 1000 angstroms. Those skilled in the art will appreciate that other metals and metal alloys could be used as suitable substitutes for those noted for barrier films 24 and metal foils 26.

Spacer 20 and barrier films 24 form the primary structural members of battery 10, and eliminate the conventional requirement for separate and additional packaging for battery 10. Spacer 20 abuts and seals the exposed perimeter of each polymeric sheet 22 to form a cavity that completely circumscribes and encloses lithium foil anode 14 and composite cathode 18. Spacer 20 is preferably formed of high density polyethylene, a polyester such as MYLAR, or another heat-sealable polymeric material, and its height is roughly the same as the combined thicknesses of metal foils 26, lithium foil anode 14 and composite cathode 18, while its width is sufficient to form a durable and reliable seal with polymeric sheets 22. In practice, the width of the spacer is about one to about five millimeters, with a preferred width being about one millimeter.

Lithium foil anode 14 has a thickness of about thirty to about one hundred micrometers, and preferably about thirty micrometers, but it is otherwise conventional in terms of lithium anodes used in primary lithium batteries. In contrast, composite cathode 18 has a novel construction that consists of, by weight percentage, 58–60% manganese dioxide (preferably 59%), 0–2% carbon (preferably 1%) and 40% electrolyte. The thickness of composite cathode 18 is about 200 micrometers, with a suitable range being about 100 to about 300 micrometers.

Preferably, the composition of the electrolyte in the composite cathode is that given in Table I:

TABLE I

|  | wt. % | mol. % |
|---|---|---|
| Polyacrylonitrile | 12.5 | 21 |
| Lithium Triflate | 8.8 | 5 |
| Ethylene Carbonate | 16.8 | 17 |
| Propylene Carbonate | 42.5 | 37 |
| γ-Butyrolactone | 19.4 | 20 |

The lithium salt is preferably lithium triflate (LiCF$_3$SO$_3$), though other suitable compounds could be substituted for or used in addition to lithium triflate, such as LiAsF$_6$, LiPF$_6$, LiClO$_4$ and Li(CF$_3$SO$_2$)$_2$N. The aprotic organic solvents are ethylene carbonate, propylene carbonate and gamma butyrolactone. In accordance with this invention, the ratio of ethylene carbonate to propylene carbonate is critical to the temperature sensitivity of the electrolyte and therefore must be maintained within about ±1% of the values shown in Table I.

In order to fabricate composite cathodes 18, carbon and MnO$_2$ powders are first thoroughly mixed. The electrolyte is then added while mixing continues to form a consistent paste. The paste is dispensed on a glass substrate which is heated to 130–150° C. for 45–60 seconds. At this point, a heated glass substrate is placed over the paste and slightly pressed to uniformly distribute the paste, thereby forming a film. The film is then cooled overnight. The glass substrates are removed and the film is placed between two sheets of teflon and the sandwich is rolled between rollers heated to about 180° C. to further reduce the thickness of the film. After rolling, the teflon skin is removed and the cathode film is cut to size. A suitable alternative to the above steps would be a continuous process by which the solution is heated and extruded between rigid plates that are passed through a pair of rollers.

Current collectors 12a and 12b are fabricated by forming each copper metal foil 26 on one surface of a corresponding polymeric sheet 22, preferably using photolithography and wet chemical etching techniques, and then forming metal barrier films 24 by coating the opposite surfaces of each sheet 22 using precision deposition methods such as sputtering or evaporation techniques. Due to the extreme thinness of the barrier films 24 and metal foils 26, these layers must be formed using precision deposition techniques. Accordingly, the current collectors 12a and 12b are formed by photolithographically developing the metal foil 26 to a thickness of about 15 micrometers on one surface of the polymeric sheet 22, which preferably has a thickness of about 25 micrometers. Either a photoresist mask or a metal mask can be suitably used to delineate an appropriate pattern for the metal foil 26 in accordance with techniques known in the art.

Figure 3:
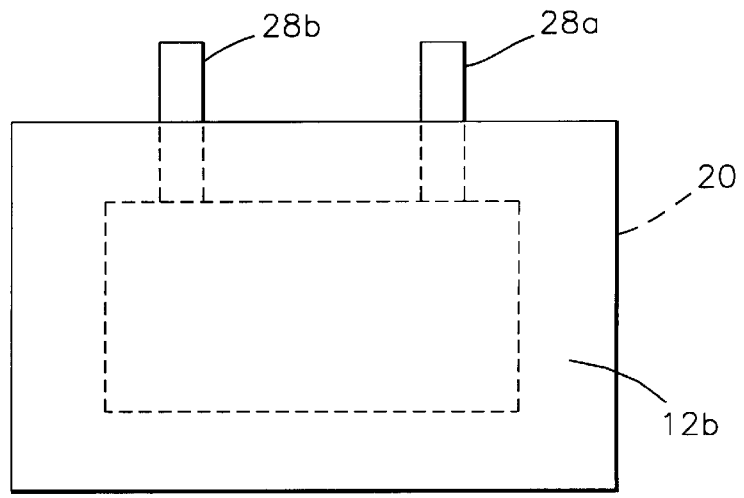
FIG. 3 is a top view of the battery of FIG. 1.

With the mask in place, metal foil 26 can be etched back such that polymeric sheet 22 is exposed at the perimeter of the surface while at the same time current collector leads 28a and 28b, shown in FIG. 3 are formed. Collector lead 28a is associated with anode 14 and collector lead 28b is associated with composite cathode 18. As shown in FIG. 3, collector leads 28a and 28b are rectangular tab-like structures protruding from the side of the battery. While this arrangement has been found to be particularly useful when the battery is used with RF-ID tags, it will be recognized that other current collector lead arrangements and configurations are also possible, and may be necessary, depending on the application in which the battery is used, and that such leads both need not be of the same configuration. The preferred etching technique is a wet chemical etch using a mixture of acetic, nitric and phosphoric acids, though dry chemical or electrochemical etching techniques could also be used. The preferred photolithographic and wet chemical etching techniques are known in the art, and therefore will not be discussed in further detail. Alternatively, current collectors 12a and 12b could be formed by stamping in accordance with techniques known in the art.

Battery 10 is then assembled in accordance with this first packaging embodiment within an inert atmosphere by laying one of the current collectors 12a on a suitable surface, with its metal foil 26 facing up. Lithium foil 14 is then placed on top of the current collector 12a, composite cathode 18 is then placed on top of anode 14 and battery 10 is enclosed around its periphery with polymeric spacer 20. Finally, battery 10 is covered with the remaining current collector 12b, such that its metal foil 26 abuts cathode 18. Battery 10 is then heat sealed at a temperature of about 170° C., such that a seal forms between the exposed edges of the polymeric sheet 22 and the spacer 20. Battery 10 can then be removed from the inert atmosphere, after which excess polymeric sheet 22 is trimmed and portions of the metal foils 26 of current collectors 12a and 12b are exposed to form leads through which power can be extracted from battery 10. Battery 10 is then tested against appropriate performance criteria.

If made in this manner, there will be a thin film of electrolyte (on the order of about 1 micron) at the interface between composite cathode 18 and anode 14, thus providing the function of an electrolyte while preventing a short circuit between composite cathode 18 and anode 14. Additionally, because the electrolyte is in the form of a thin film at the interface between composite cathode 18 and anode 14, the resistance to ionic transport is minimized resulting in better battery performance as shown in FIG. 4, compared to a battery which has a separate solid polymer electrolyte membrane as in FIG. 2.

Figure 4:
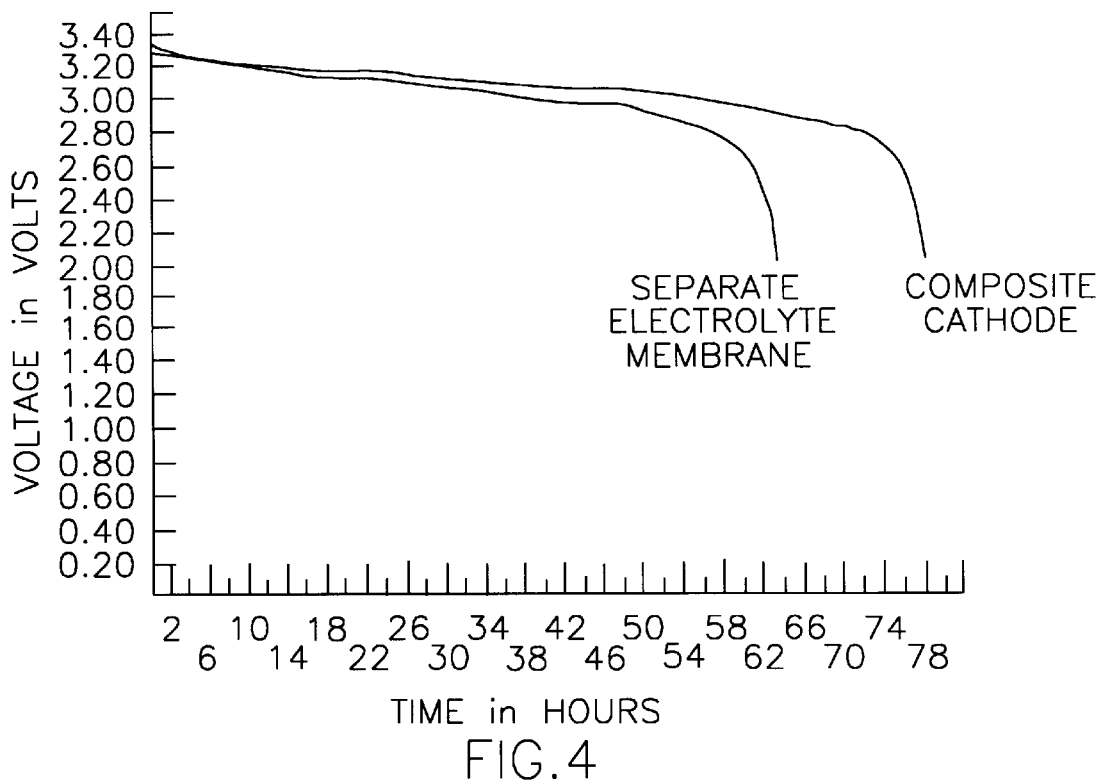
FIG. 4 is a graph of cell voltage vs. discharge time for a lithium primary battery having a polymeric electrolyte membrane and a lithium primary battery having a composite cathode in accordance with the invention.

FIG. 4 shows cell voltage variation as a function of discharge time at ambient temperature for batteries having the composite cathode construction of this invention and copper current collectors and batteries having a separate solid polymeric electrolyte membrane with copper metal foils in their current collectors, both at a continuous discharge current density of 25 $\mu$A/cm$^2$. FIG. 4 shows the improved performance realized by the composite cathode batteries of this invention.

Figure 5:
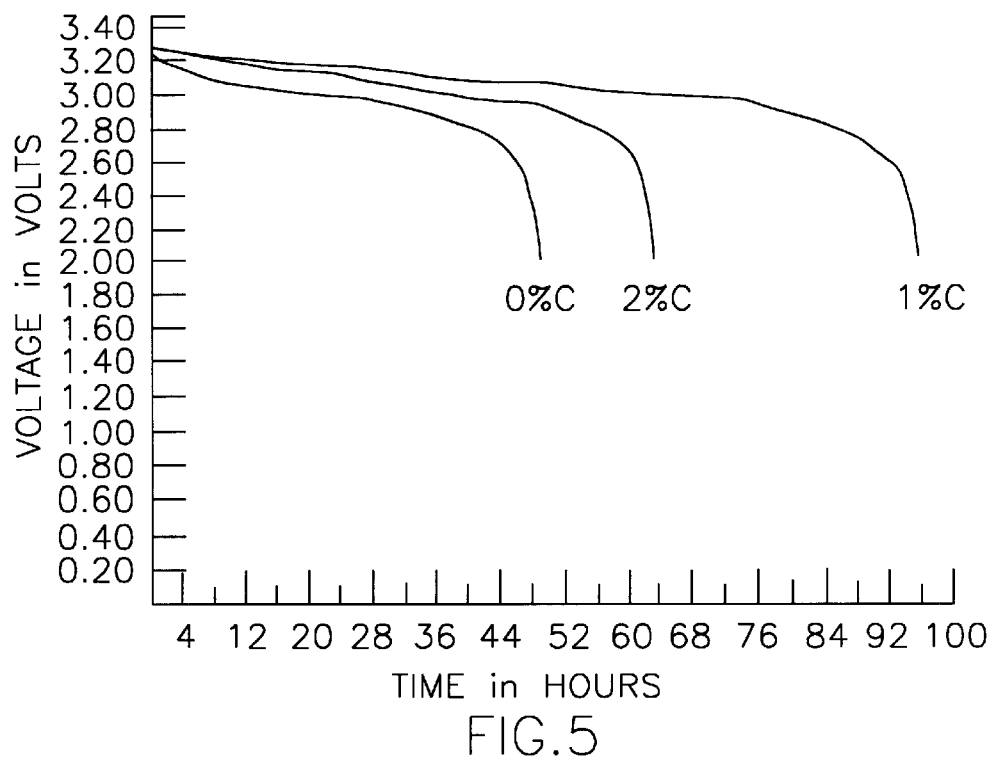
FIG. 5 is a graph of cell voltage vs. discharge time for three flexible primary batteries of the FIG. 2 configuration, each having a different amount of carbon in their cathodes.

FIG. 5 shows cell voltage variation of batteries of the type shown in FIG. 2 with discharge time at ambient temperature for batteries having 0, 1 and 2 weight percent carbon in their composite cathodes at a continuous discharge current density of 25 $\mu$A/cm$^2$. FIG. 5 optimum carbon level is about 1 weight percent. This result obtains for batteries with and without separate electrolyte membranes and where copper is used for the current collectors or the metal foil in the current collectors.

In operation, battery 10 is ideally suited for use in SSPDs such as radio frequency identification tags, PCMCIA cards, and smart cards. If composite cathode 18 is made using electrolyte of the Table I composition, 1% carbon and 59% MnO$_2$, battery 10 is able to perform suitably at temperatures down to about –20° C., characterized by the ability to deliver at least about 100 $\mu$A/cm$^2$ for a pulse on-time of about 150 milliseconds and a pulse period of about one second, while sustaining a minimum voltage of greater than 2.5 volts.

Figure 6:
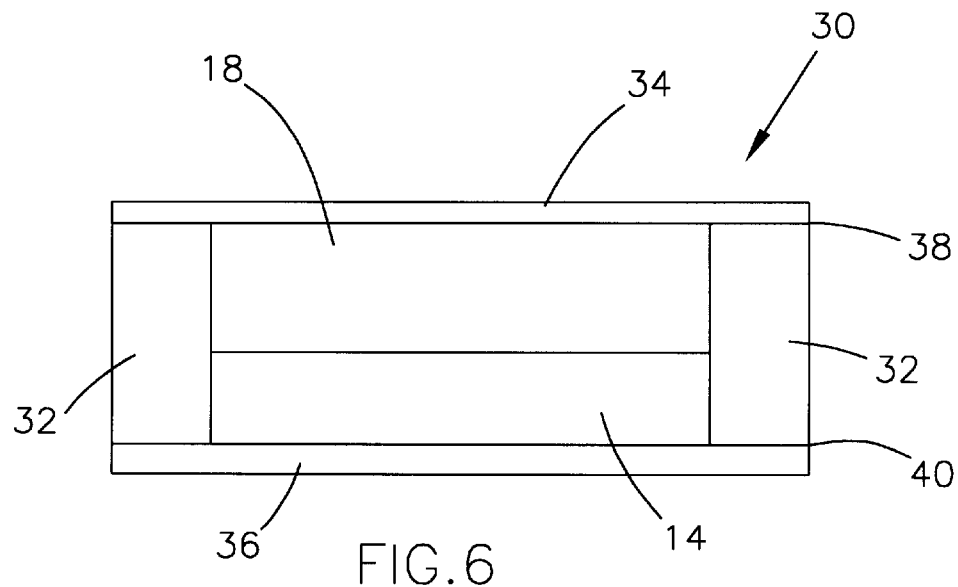
FIG. 6 shows in cross section the construction of a flexible primary battery of this invention packaged in accordance with a second preferred packaging embodiment of this invention.

FIG. 6 shows a second packaging embodiment in accordance with this invention. In FIG. 6, there is shown battery 30 consisting of lithium foil anode 14 and composite cathode 18. Surrounding the edges of battery 30 is spacer 32. On the top and bottom of battery 30 are current collectors 34 and 36, respectively. Current collectors 34 and 36 are made of metal, such as copper, and overlie both the battery and spacer 32. Spacer 32 is of a polymeric material coated on both sides with Surlyn. The coated sheet is available from the Ludlow Corporation. The Surlyn coated sheet meets collectors 34 and 36 at interfaces 38 and 40, respectively. Surlyn coated spacer 32 is heat sealable (at a temperature of about 150–200° C.) to collectors 34 and 36. Thus, the battery may be formed of any required shape to meet its intended use environment, surrounded by spacer 20 whose height matches that of the battery, and overlaid by collectors 34 and 36 which are heat sealed to spacer 20 around the periphery of the battery to form an encased battery package. The above steps are performed in an inert atmosphere as described in conjunction with the first packaging embodiment described above.

Figure 7:
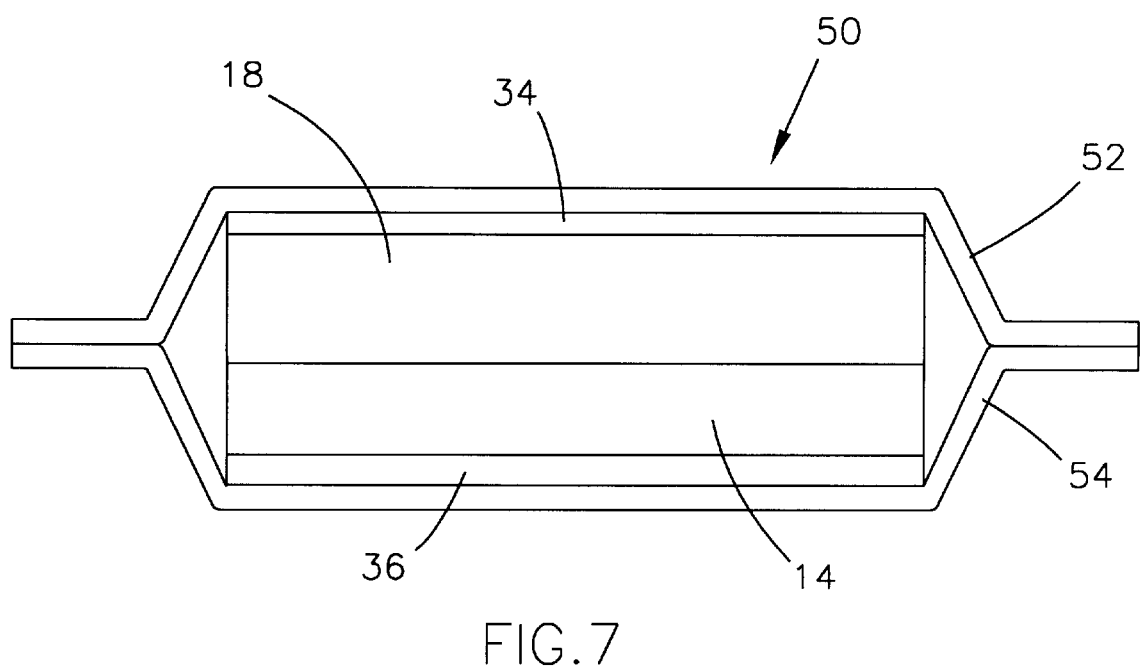
FIG. 7 shows in cross section the construction of a flexible primary battery this invention packaged in accordance with a third preferred packaging embodiment of this invention.

FIG. 7 shows a third packaging embodiment. Again, battery 50 consists of lithium foil anode 14 and composite cathode 18 with current collectors 34 and 36 on the top and bottom of the battery, respectively. In this embodiment, the current collectors are not exposed as in the case of the embodiment of FIG. 6 since, in this embodiment, the battery is encased by packaging material sheets 52 and 54. However, in order to function, contact must be made with the current collectors which necessitates that they extend beyond or through sheets 52 and 54 as do tabs 28a and 28b in FIG. 3. Indeed, the arrangement shown in FIG. 3 is one means for configuring the battery of this embodiment. Sheets 52 and 54 thus must be heat sealable to each other and to metallic current collectors 34 and 36. A material which was found suitable for this purpose was DZ260 which is available from the American National Can Company and which consists of a sheet of polyethylene sealed to a sheet of Saran and coated on one side with EAA (ethylacetic acid).

From the above, it can be seen that the batteries of this invention are uniquely capable of performing well in SSPD applications, since the batteries provide for a rugged flexible construction yet employ solid polymer composite cathodes that have electrical and power generating properties similar to liquid electrolyte batteries. The solid construction of the batteries of the invention is particularly necessary for use in self-contained applications that, by the nature of their use, expose the battery to hostile environmental conditions. Furthermore, the batteries of this invention enable a wide range of uses in SSPD and similar applications due to their enhanced performance at sub-ambient temperatures. In particular, use of polyacrylonitrile as the polymer matrix for the composite cathode enables the batteries to exhibit conductivity at ambient temperatures on the order of liquid electrolytes employed with conventional primary batteries, and further enables the batteries to function at temperatures that are lower than was possible before by optimizing the ratio of the aprotic organic solvents within the composite cathode.

In addition to the above, exposure of the lithium intercalation compounds within the composite cathode is eliminated by the manner in which the composite cathode is encapsulated within a polymeric matrix that includes the electrolyte. Therefore, the disclosed batteries of the invention are significantly safer than both liquid electrolyte batteries and prior art solid electrolyte batteries.

While this invention has been described in terms of preferred and alternative embodiments, those skilled in the art will appreciate many modifications which may be made without departing from the spirit and scope of the invention. All such modifications are intended to be included within the scope of the claims appended hereto.

What is claimed is:

1. A flexible primary battery comprising an anode and a flexible polymeric composite cathode contained within a polymeric binder and having manganese dioxide, carbon and an electrolyte therein, the electrolyte comprising a lithium salt and an organic aprotic solvent solution, the organic aprotic solvent solution comprising ethylene carbonate, propylene carbonate and gamma-butyrolactone, wherein the anode and the flexible polymeric composite cathode contact each other.

2. A flexible primary battery as recited in claim 1 wherein the polymeric binder is polyacrylonitrile.

3. A flexible primary battery as recited in claim 1 wherein the flexible polymeric composite cathode has a conductivity of at least about $10^{-3} \Omega^{-1}$ cm$^{-1}$ at ambient temperatures.

4. A flexible primary battery as recited in claim 1 wherein the molar ratio of ethylene carbonate to propylene carbonate to gamma-butyrolactone in the electrolyte is about 1:2:1.

5. A flexible primary battery as recited in claim 1 wherein the flexible polymeric composite cathode comprises about fifty nine weight percent manganese dioxide, about forty weight percent electrolyte, and about one weight percent carbon.

6. A flexible primary battery as recited in claim 1 wherein the battery is a lithium battery.

7. A flexible primary battery comprising:
   a first flexible current collector;
   a lithium anode contacting the first flexible current collector;
   a flexible polymeric composite cathode comprising about fifty-nine weight percent manganese dioxide, about forty weight percent electrolyte and about one weight percent carbon contained within a polymeric binder, the electrolyte comprising a lithium salt and an organic aprotic solvent solution, the organic aprotic solvent solution comprising ethylene carbonate, propylene carbonate and gamma-butyrolactone in a molar ratio of about 1:2:1; and
   a second flexible current collector contacting the flexible polymeric composite cathode.

8. A flexible primary battery as recited in claim 7 wherein the polymeric binder is polyacrylonitrile.

9. A flexible primary battery as recited in claim 7 wherein the flexible polymeric composite cathode has a conductivity of at least about $10^{-3} \Omega^{-1}$ cm$^{-1}$ at ambient temperature.

10. A flexible primary battery as recited in claim 7 wherein the flexible primary battery lacks an electrolyte membrane such that the flexible polymeric composite cathode contacts the lithium anode.

11. A flexible primary battery as recited in claim 7 wherein the molar ratio of ethylene carbonate to propylene carbonate to gama-butyrolactone in the flexible polymeric composite cathode is about 17:37:20.

12. A flexible primary battery as recited in claim 7 wherein each of the first and second flexible current collectors is a composite comprising a polymeric sheet with a metallic barrier film deposited on one of its surfaces and a metal foil formed on its opposite surface, the metallic barrier films forming the outermost top and bottom surfaces of the flexible primary battery.

13. A flexible primary battery as recited in claim 7 wherein each of the first and second current collectors is a metal.

14. A flexible primary battery comprising:
   a first outer encapsulating layer;
   a first flexible current collector;
   a lithium anode contacting the first flexible current collector;
   a flexible polymeric composite cathode contacting the lithium anode, the flexible polymeric composite cathode consisting of about fifty-nine weight percent manganese dioxide, about forty weight percent electrolyte and about one weight percent carbon contained within a polymeric binder, the electrolyte comprising a lithium salt and an organic aprotic solvent solution, the organic aprotic solvent solution comprising ethylene carbonate, propylene carbonate and gamma-butyrolactone in a molar ratio of about 1:2:1;
   a second flexible current collector contacting the flexible polymeric composite cathode; and
   a second outer encapsulating layer, the first and second outer encapsulating layers being sealed to each other to thereby enclose the current collectors, anode and composite cathode.

15. A flexible primary battery as recited in claim 14 further including metallic electrode protrusions protruding through the first and second outer encapsulating layers, the first and second outer encapsulating layers being sealed to the electrode protrusions.

16. A flexible primary battery as recited in claim 1 wherein the anode and the flexible polymeric composite cathode are encapsulated by first and second outer encapsulating layers that are sealed to each other.

17. A flexible primary battery as recited in claim 16, further comprising metallic electrode protrusions protruding through and sealed to the first and second outer encapsulating layers.

18. A flexible primary battery as recited in claim 1, further comprising a first metal current collector contacting the anode, a second metal current collector contacting the flexible polymeric composite cathode, and a polymeric spacer surrounding the anode and the flexible polymeric composite cathode, wherein each of the first and second metal current collectors is bonded directly to the spacer.

19. A flexible primary battery as recited in claim 7, wherein the flexible primary battery lacks an electrolyte membrane such that the lithium anode and the flexible polymeric composite cathode contact each other.

20. A flexible primary battery as recited in claim 13, further comprising a polymeric spacer surrounding the lithium anode and the flexible polymeric composite cathode, wherein each of the first and second current collectors is bonded directly to the spacer.

* * * * *